United States Patent [19]

Daigle et al.

[11] Patent Number: 4,751,396
[45] Date of Patent: Jun. 14, 1988

[54] INFRA-RED SECURITY SYSTEM

[75] Inventors: Robert V. Daigle, Pompano Beach; Jacob Smitter, Ft. Lauderdale, both of Fla.

[73] Assignee: Electronic Key Inc., Pompano Beach, Fla.

[21] Appl. No.: 4,908

[22] Filed: Jan. 20, 1987

Related U.S. Application Data

[63] Continuation-in-part of Ser. No. 837,882, Mar. 10, 1986.

[51] Int. Cl.$^4$ .................... H02J 1/00; F05B 45/06; G08C 19/00
[52] U.S. Cl. .................... 307/10 AT; 307/10 R; 307/9; 340/543; 340/825.72; 455/606
[58] Field of Search .................... 307/10 AT, 10 R, 9; 455/603, 606, 607; 340/901-904, 63, 64, 68, 543, 555-557, 578, 600, 693, 696, 825.3, 825.72, 349; 250/349, 347, 214, 206, 239

[56] References Cited

U.S. PATENT DOCUMENTS 4,143,368  3/1979  Route et al. .................... 340/543
4,413,261  11/1983  Greenberg .................... 307/10 AT X

FOREIGN PATENT DOCUMENTS 2122044  1/1984  United Kingdom .................... 455/606

Primary Examiner—William M. Shoop, Jr.
Assistant Examiner—Sharon D. Logan
Attorney, Agent, or Firm—Melvin K. Silverman

[57] ABSTRACT

An electronic security system which includes an infrared (IR) transmitter operable to broadcast a digital identification code signal at a pre-selectable programmable baud rate. Also included is an IR receiver responsive to the identification code signal received at the programmed baud rate. Further included is a comparator within the receiver to compare the received IR signal and its baud rate with baseline references. The comparator is operably coupled with an ignition circuit when the pre-selected code and baud rate matches the received digital code and baud rate. Both said transmitter and receiver are held within enclosures that are, on their external surfaces, IR transparent and visible light opaque. The internal surfaces of said enclosures are IR reflective.

4 Claims, 1 Drawing Sheet

INFRA-RED SECURITY SYSTEM

REFERENCE TO RELATED APPLICATION

This case is a continuation-in-part of application Ser. No. 837,882, dated Mar. 10, 1986 entitled Infra-Red Security System.

BACKGROUND OF INVENTION

This invention relates to coded-access, security systems having broad generalized application.

One particular application of such security systems is in anti-theft arrangements for placement within vehicle engine ignition circuits such that the ignition circuit cannot be actuated except through the use of a coded signal and baud rate known only by an authorized driver of the vehicle. In most prior art systems along these lines, a code transmitter is wired into the engine ignition circuit, while in others the code transmitter comprises a radio transmitter which broadcasts a coded signal to the receiver which is wired into the engine ignition circuit.

Earlier efforts along the above lines have made exclusive use of radio frequencies and, to the knowledge of the inventors, have not made use of the possibilities inherent in the use of infrared.

The prior art, as best known to us, is represented by U.S. Pat. Nos. 4,240,516 (1980) to Henderson, 4,413,261 (1983) to Greenberg, and 4,143,368 (1979) to Route. None of these patents or other art known to us, employs modulated infrared light. This approach, in addition to avoiding the need for approval by the Federal Communications Commission, makes possible a higher degree of precision and, thereby, reliability of operation. Also, a higher number of digital code combinations can be attained without any corresponding increase in design complexity. The use of a programmable baud rate increases the security level of the system by yet further orders of magnitude.

SUMMARY OF THE INVENTION

The present invention is an electronic security system that comprises an infra-red (IR) transmitter operable to broadcast a digital identification code signal at a preselectable programmable baud rate. Also provided is an IR receiver responsive to said identification code signal received at said baud rate. There is also provided comparator means within said receiver to compare received IR digital code signals, and the baud rates thereof, with digital code and baud rate reference means.

Further provided are means operably coupled to said comparator means for enabling an actuation to occur when said reference means match the transmitted IR digital code and baud rate.

Both said transmitter and receiver are held within enclosures that are, on their external surfaces, IR transparent and visible light opaque. The internal surfaces of said enclosures are IR reflective.

It is, therefore, a principal object of this invention to provide a novel and improved coded control system for actuation means such as ignition circuit of the vehicle engine to thereby prevent an unauthorized starting of the vehicle.

A further positive feature of the invention is that, when the ignition switch is closed after being open for several minutes, the receiver/controller unit is reset to the starting condition wherein it will be ready to respond to the next transmitted coded signal.

A further object is to provide a dual code control system wherein two coding parameters are necessary in order to effect the actuation of the engine ignition circuit.

The above and yet other objects and advantages of the present invention will become apparent from the hereinafter set forth Detailed Description of the Invention, the Drawings, and the Claims appended herewith.

DETAILED DESCRIPTION OF THE INVENTION

Figure 1:
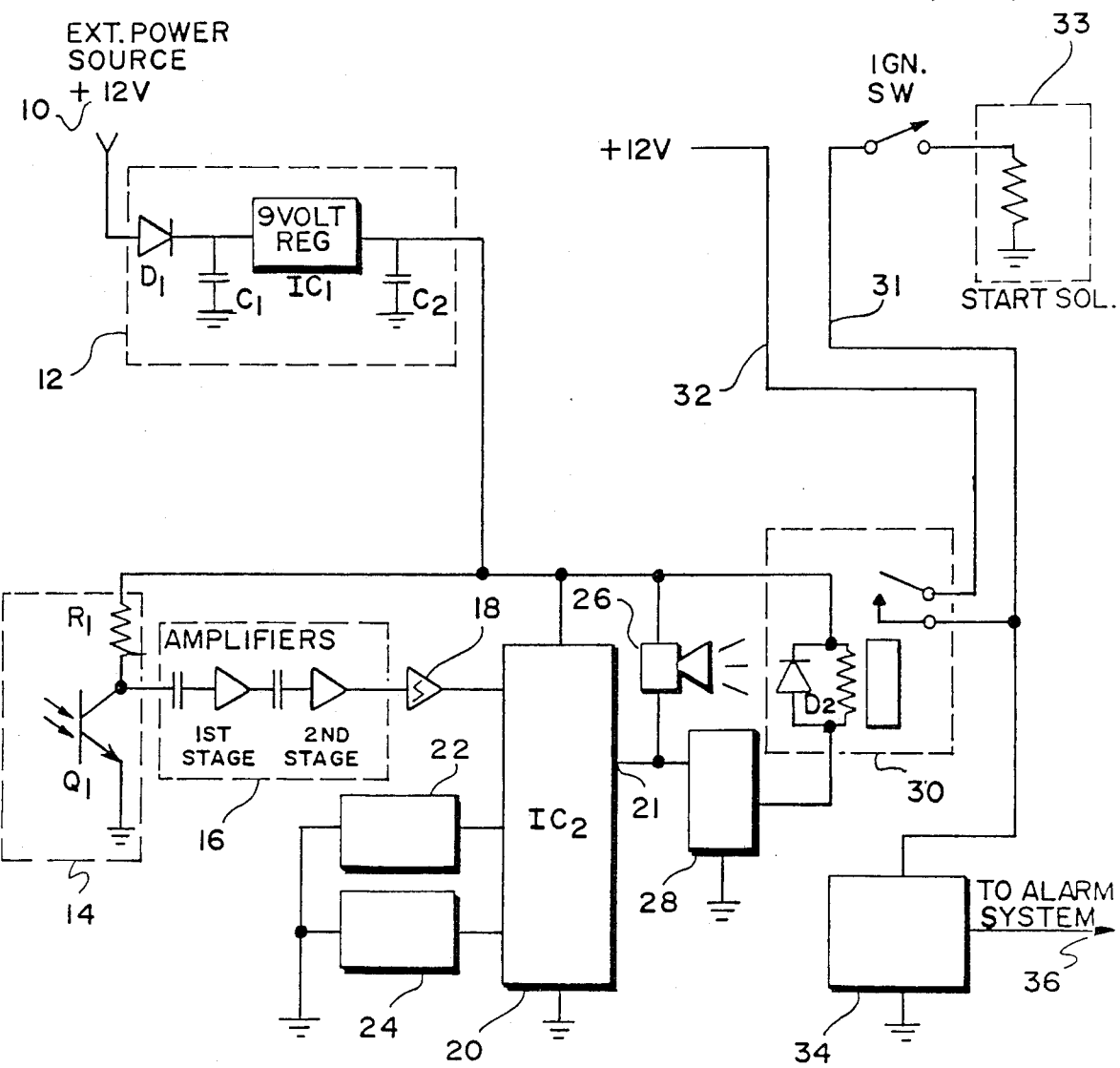
FIG. 1 is a schematic diagram of an inventive infrared digital receiver.

With reference to FIG. 1 there is shown an external power source 10 which provides the input to an internal power supply unit 12. Said internal power supply unit 12 includes a diode D1 which insures current flow in only one direction and protects the power supply unit 12 from reverse current or power transients. D1 is coupled with C1 which serves as a filter. Within power unit 12, IC-1 comprises a 9 volt monolithic regulator, while C-2 serves as a filter for the IC-1 regulator. Thereby, the output of power supply 12 is highly filtered and regulated at a nine volt level which is fed into an infrared (IR) detector 14 from point 18.

Said IR detector 14 includes a phototransistor Q-1 having a resistor R-1 in its collector. Thereby, R-1 will determine the gain of the phototransistor Q-1 which, as is shown in FIG. 1, is arranged in an amplifier configuration.

The IR detector 14 drives amplifier stage 16 which is composed of two AC amplifiers, defining a first stage and a second stage, the function of which is to amplify the input to amplifier stage 16 to a usable output level.

Amplifier stage 16 drives squaring circuit 18 which operates to convert the analog input thereof into a digital output having a form that can be used throughout the system as described herein-below.

The output of squaring circuit 18 drives a comparator/decoder 20. The function of comparator/decoder 20 (IC2) is to take the digital code pre-programmed into block 22 and to compare it with the digital code received at decoder 20 via the IR detector 14 which, in operation, acts as an IR receiver from an IR transmittor below described.

Also shown is a programmable baud rate selector (PBRS) 24. Block 24, like block 22, is pre-programmed to enable it to compare the baud rate of the IR input to comparator/decoder 20. Accordingly, it is to be appreciated that while block 22 acts as the key or reference by which block 22 can compare the IR signal received by the system to the programmed digital code, block 24 acts to compare the rate of the received IR signal with a particular programmed baud rate. Thusly, comparator/detector 20 will "clear" the received IR signal only if both the digital code of said IR signal and the baud rate of said signal match the pre-programmed digital sequence and baud rate that have been placed into blocks 20 and 24 respectively.

It is accordingly seen that the output of detector 20, defined at mode 21, will provide either a positive or negative output. A positive output can, as above noted, only be obtained where the baud rate and the digital code of the IR signal match the pre-programmed rate and digital code. Where both the baud rate and digital code match, point 21 will take a digital low state, thereby causing an audible beeper 26 to generate a sound. This will cause relay latch driver 28 to actuate; latch driver 28 will stay actuated even after node 21 returns to a digital high state. After 20 seconds, relay latch driver 28 will reset itself and go into its resting state.

While latch driver 28 is actuated, relay unit 30 will close its contact. In unit 30, diode D-2 comprises a diode which clamps the relay's coil thereby preventing inductive voltage spikes from damaging the circuit of FIG. 1. From relay unit 30 runs receiver/relay output 32 which connects to the external (12 volt) battery 10.

At the lower right corner of FIG. 1 is shown a tamper detector 34. Its function is to sense the voltage of starter solenoid 33 to which it is connected by wire 31.

When the system is not activated; that is, when the proper IR signal is not received by IR detector 14, the latch in relay 30 will not close. This means the power to the starter solenoid 33 is interrupted and nothing can happen if an attempt is made to start the engine. Accordingly, without the use of the proper code and baud rate for the IR signal, it is not possible to actuate the solenoid 33 to start the automobile.

If one attempts to "jump" the solenoid, tamper protector 34 will sense that the voltage in line 31 is not zero and, upon such condition, will generate a signal which will actuate the alarm 36.

With reference to the right side of FIG. 1, it is noted that relay output line 32 is connected to the ignition system as follows: the battery side of the ignition switch must be interrupted and connected to lines 31 and 32 as shown in relay unit 30. When the latch in unit 30 is closed across lines 31 and 32, a normal functioning of the car starter will occur. However, when the latch within unit 30, connecting lines 31 and 32, is open, the tamper detector 34 will sense that line 31 is "out of the circuit." If an attempt is made to start the car and the ignition switch closes, the alarm system 36 will be activated.

Figure 2:
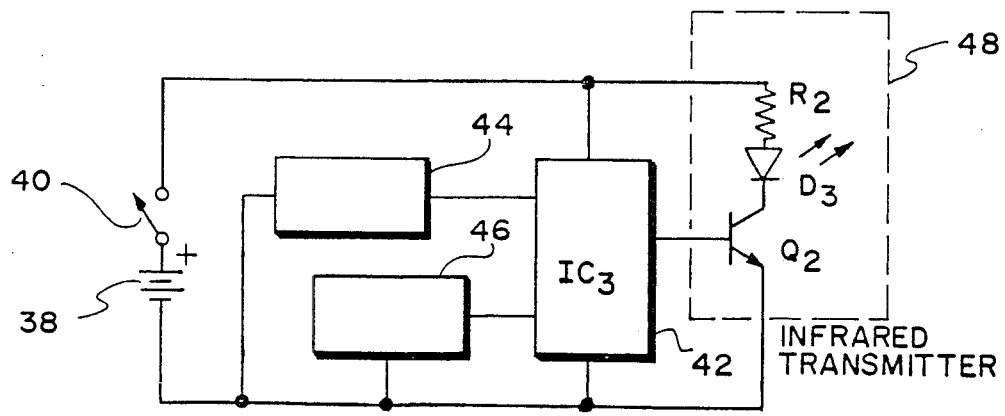
FIG. 2 is a schematic diagram of a portable infrared digital transmitter, used with the receiver.

Shown in FIG. 2 is a diagram of a portable IR transmitter. This IR transmitter is used as an electronic key to generate the correct signal to IR detector 14 of FIG. 1.

Shown in FIG. 2 is a DC battery 38, a switch 40 with which the transmitter system is turned on, an identification code driver 42, an identification code generator 44, a programmable baud rate selector 46, and an I.R. transmitter circuit 48. Transmitter 48 includes a photo-diode D-3 placed into the collector of transistor Q-2.

For the system of FIG. 2 to transmit an IR signal capable of actuating the IR detection and comparator circuit 20 of FIG. 1, the code generator 44 and rate selector 46 of the transmitter must be programmed for compatability with code block 22 and baud rate block 24 of the receiver. The IR transmitter FIG. 2 can be miniaturized so that it is no larger than a key to an automobile.

It has been found that a number of benefits can be obtained if both said transmitter and receiver are housed within an enclosure that is, on its external surface, both IR transparent and visible light opaque and which, on its internal surface, is IR reflective. Such an enclosure will prevent accidental actuation by stray RF or intense visible light. Also, it is capable of receiving a signal from any direction; therefore, the receiver becomes substantially omnidirectional as far as the orientation of the IR detector 14 is concerned.

Further, the use of a visible light opaque material will render it almost impossible for an intruder to analyze the security system; that is, one cannot determine the type of electromagnetic radiation that is employed by the system.

The reflective internal surface of the enclosure will cause the IR signal to "bounce around" with the enclosure thereby increasing the effective signal density in the receiver. This will act to increase the reliability of the receiver.

It has been found that the above type of enclosures will also increase the effective range of an IR signal.

Ninety (90) mil polybutyrate (a Kodak product) has been found to possess suitable optical properties, as described above, for use as the enclosure material. In order to achieve the reflective property of the interior surface, said surface may be provided with a mirrored finish.

While there has been shown and described the preferred embodiments of the present invention, it is to be understood the invention may be embodied otherwise than is herein illustrated and described and that in said embodiments, certain changes in the detailed construction, and in the form and arrangement of parts may be made without departing from the underlying idea or principles of this invention within the scope of the appended claims.

We claim:

1. An electronic security system, comprising:
   (a) an infrared (IR) transmitter operable to broadcast a digital identification code signal at a pre-selectable baud rate;
   (b) an IR receiver responsive to said identification code signal received at said baud rate;
   (c) an enclosure for said receiver, said enclosure being both IR transparent and visible light opaque on its external surface and IR reflective on its internal surface;
   (d) comparator means in said receiver to compare received IR digital coded signals, and the baud rates thereof, with digital code and baud rate reference means; and
   (e) means operably coupled to said comparator means for enabling an actuation to occur when said reference means match the transmitted IR digital code and baud rate whereby, enhanced reliability and range, and omnidirectionality, is obtained through the use of said enclosure for said receiver/transmitter;
   (f) an enclosure for said transmitter, said enclosure being both IR transparant and visible light opaque on its external surface, and IR reflective on its internal surface.

2. The security system as recited in claim 1, in which said enabling means comprises an automobile ignition circuit.

3. The security system as recited in claim 1, further comprising: means, in said transmitter for generating a pre-selectable IR digital code.

4. The security system as recited in claim 3, further comprising: means for programming a pre-selectable baud rate for said IR digital code.

* * * * *